United States Patent [19]

Breitfeld

[11] 4,101,091
[45] Jul. 18, 1978

[54] VEHICLE SAFETY BELT APPARATUS

[75] Inventor: Günter Breitfeld, Fallersleben, Germany

[73] Assignee: Volkswagenwerk Aktiengesellschaft, Germany

[21] Appl. No.: 688,487

[22] Filed: May 20, 1976

[30] Foreign Application Priority Data
Jun. 5, 1975 [DE] Fed. Rep. of Germany ....... 2525035

[51] Int. Cl.² .................... A62B 35/00; B65H 75/48
[52] U.S. Cl. .............................. 242/107; 242/107.4 R; 280/744
[58] Field of Search .......... 242/107, 107.4 R–107.4 E, 242/107.6, 107.7; 297/388; 280/744–747

[56] References Cited
U.S. PATENT DOCUMENTS

| 3,343,623 | 9/1967 | Porter | 280/745 X |
| 3,462,192 | 8/1969 | Fredericks | 297/388 X |
| 3,529,865 | 9/1970 | Atwell | 297/388 |
| 3,819,197 | 6/1974 | Shakespear | 297/388 X |
| 3,957,222 | 5/1976 | Bladh | 242/107 |

FOREIGN PATENT DOCUMENTS
1,479,711 7/1969 Fed. Rep. of Germany.

Primary Examiner—Stanley N. Gilreath
Assistant Examiner—John M. Jillions
Attorney, Agent, or Firm—Brumbaugh, Graves, Donohue & Raymond

[57] ABSTRACT

A vehicle safety belt, which is mounted to an automatic winding device is provided with increased longitudinal rigidity in the region of the winding device, which tends to reduce the spring force of the winding device applied to the passenger when the safety belt is used.

4 Claims, 2 Drawing Figures

VEHICLE SAFETY BELT APPARATUS

BACKGROUND OF THE INVENTION

This invention relates to vehicle safety belts, and in particular to such safety belts as are provided with automatic winding devices activated by spring force.

Safety belts are often provided with winding devices to increase the convenience and comfort of using the belt. Such winding devices generally include a spring activating roller which winds the belt when the belt is not being used to avoid the undesired presence of an excessive number of loose safety belts around the inside of the vehicle. When a vehicle occupant applies the safety belt, the belt is unwound from the roller and inserted into a belt lock. The spring force of the roller causes the belt to be applied closely to the vehicle occupant and the roller is generally provided with a locking device which prevents unwinding of the roller when the belt is subjected to a sudden force such as occurs in a vehicle collision.

One problem associated with such prior art safety belts is that in order to provide complete and effective retraction of the safety belt when the belt is not being used, it is necessary to provide the winding device with a rather strong rolling spring. Because of the inherent design of this spring rolling device, the spring force applied on the belt is greatest when the belt is unwound and applied to a vehicle occupant. While the passenger is free to move about against the winding force of the spring, the constant pressure of the spring may result in discomfort to the vehicle occupant, particularly on a long trip.

The passenger discomfort may be reduced by providing a weaker spring force on the roller of the winding device and therefore reduced belt force against the vehicle occupant. This solution often results in insufficient spring force to provide effective safety belt retraction particularly after a period of usage.

It is therefore an object of the present invention to provide a vehicle safety belt apparatus with a spring activated winding device wherein winding forces applied to a vehicle occupant are reduced.

It is a further object of the invention to provide such a safety belt apparatus wherein the winding forces are sufficient to effectuate complete retraction of the safety belt.

SUMMARY OF THE INVENTION

In accordance with the present invention there is provided a vehicle safety belt apparatus, which includes a safety belt winding device with a spring activating roller for retracting a safety belt and a safety belt, mounted on the roller. The safety belt includes a first belt portion which is approximately the portion remaining on the roller when the safety belt is applied to a vehicle occupant and a second belt portion which is the remainder of the safety belt. The first portion is formed of material having a greater longitudinal rigidity than the second portion. When this first portion protrudes somewhat from the safety belt winding device (i.e., when the belt has been applied around the vehicle occupant) its resistance to bending around the roller reduces the force applied to the occupant.

In a preferred embodiment of the invention the first belt portion is approximately 25 percent of the total length of the safety belt and rigidity is provided by impregnating the safety belt with a plastic, such as synthetic resin.

For a better understanding of the present invention together with other and further objects thereof, reference is made to the following description taken in conjunction with the accompanying drawings and its scope will be pointed out in the appended claims.

DESCRIPTION OF THE INVENTION

Figure 1:
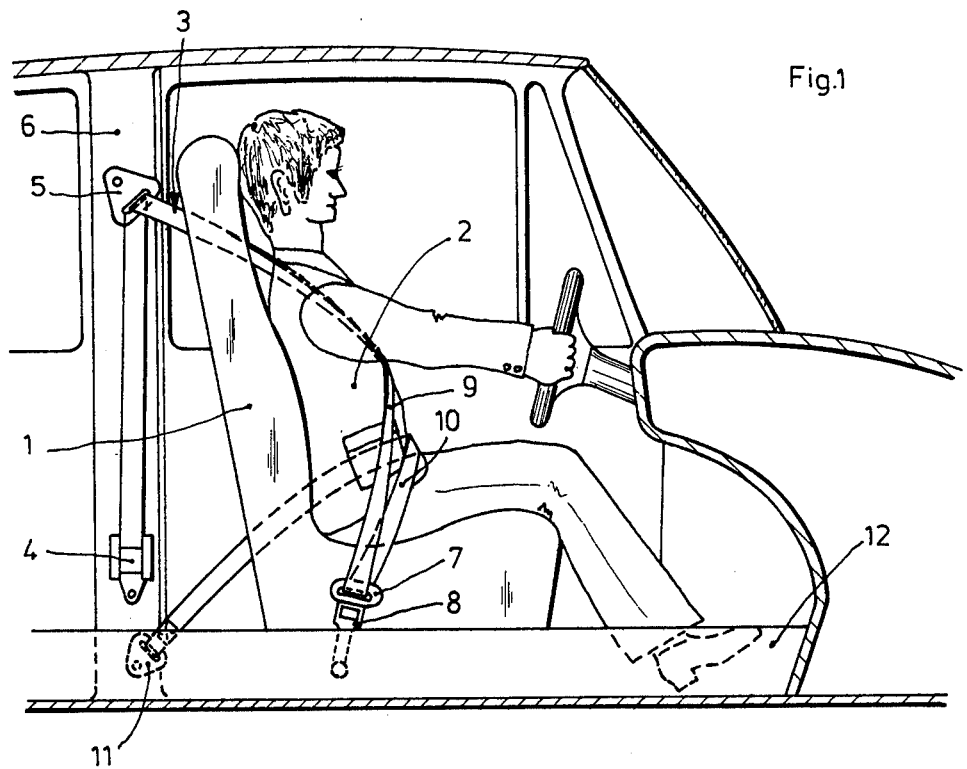
FIG. 1 is a center line cross sectional view of a vehicle illustrating a safety belt apparatus in accordance with the present invention.
Figure 2:
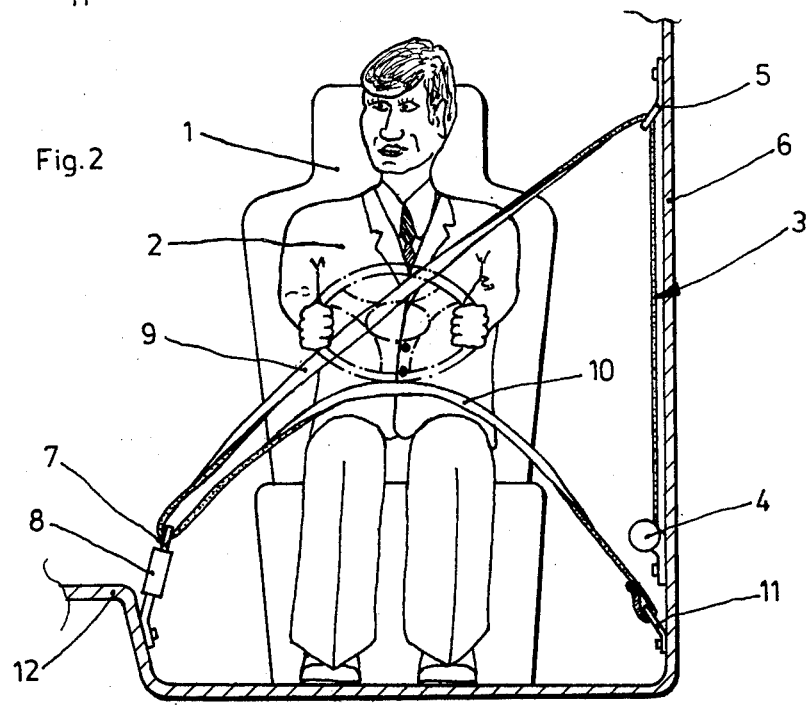
FIG. 2 is a transverse cross sectional view of the FIG. 1 vehicle illustrating a safety belt apparatus in accordance with the present invention.

FIGS. 1 and 2 illustrate a safety belt apparatus in accordance with the present invention installed on a vehicle. The safety belt apparatus is used in conjunction with a vehicle seat 1 to provide restraint for a vehicle occupant 2. The belt apparatus is provided with an automatic belt winding device 4, which includes a spring activated roller to retract the belt 3 when the safety belt apparatus is not in use. In addition belt winding device 4 is usually provided with a belt locking device to prevent unrolling of the safety belt when a sudden force is applied to the belt, such as on occurrence of a vehicle collision.

In accordance with the illustrated embodiment the belt 3 passes through a belt deflecting device 5 mounted on a column 6 of the vehicle. One section 9 of the belt 3 is applied across the shoulder of the vehicle occupant 2 and retained in a second belt deflecting device 7 which is connected to the center tunnel of the vehicle 12 by a locking mechanism 8. Another section 10 of the belt passes across the waist of the vehicle occupant and is connected to the chassis of the vehicle by a belt restraining loop 11.

The safety belt illustrated in FIGS. 1 and 2 is of a familiar type and provides both waist and shoulder restraint to the vehicle occupant. The safety belt is applied by connecting locking device 8 at the center of the vehicle and the spring force in winding device 4 pulls the belt through deflection loops 5 and 7 to provide close fitting adjustment of the safety belt length about the vehicle occupant. When the safety belt apparatus is not being used, belt winding device 4 retracts the safety belt causing the deflection loop 7 and belt sections 9 and 10 to be drawn into close proximity to the vehicle column 6, thereby placing the safety belt out of the way of passenger entry and exit and in a convenient position for application by the next vehicle occupant.

In order to provide sufficient spring force for complete retraction of the safety belt 3, winding device 4 must be provided with a rather stiff winding spring. Such a stiff winding spring will cause a constant pressure to be applied to the vehicle occupant, particularly on the shoulder in the embodiment of FIGS. 1 and 2. This constant pressure on the occupant's shoulder may cause discomfort and an inclination not to use the safety belt. A reduced spring force on winding device 4 will not provide sufficient force for complete retraction when the belt is not in use.

In accordance with the present invention the force of the belt 3 on the vehicle occupant is reduced by providing a longitudinal rigidity, or increased resistance to belt bending, on the portion of the belt which remains in part on belt winding device 4 when the safety belt is applied to a vehicle occupant. This increased rigidity reduces the retracting force of the winding device on the vehicle occupant when the belt is applied, thereby increasing the comfort of the safety belt and encouraging use of the belt by vehicle occupants. The rigidity can be increased to a point that the spring exerts less pressure in the applied position than in the fully wound position.

Typically the portion of the vehicle safety belt remaining on winding device 4 when the belt is applied to a vehicle occupant is approximately 25 percent of the total belt length for a safety belt of the type illustrated in FIGS. 1 and 2. This portion of the total safety belt length which remains on the winding device facilitates movement of the passenger by unrolling when the passenger turns or bends forward. This additional length on the winding device also facilitates application of the safety belt to the vehicle occupant.

The increased longitudinal rigidity of the safety belt on the portion which remains on the belt winding device may be provided by impregnating the fibers of the safety belt with a plastic substance, such as a polyester resin to rigidify the fibers of the safety belt. This technique of rendering increased longitudinal rigidity in the portion of the safety belt on the winding device reduces the belt winding forces applied to the vehicle occupant without decreasing the total force of the winding spring which would result in inadequate belt retraction, and without any significant change in the structure of the safety belt device itself.

While there has been described what is believed to be the preferred embodiments of the present invention, those skilled in the art will recognize that other and further modifications may be had thereto without departing from the true spirit of the invention, and it is intended to cover all such embodiments which fall within the true scope of the invention.

I claim:

1. In a vehicle safety belt apparatus, including a safety belt winding device, having a spring activated roller for retracting a safety belt, and a safety belt, mounted on said roller and having a first belt portion comprising at least the portion of said safety belt remaining on said roller when said safety belt is applied to a vehicle occupant and a second belt portion comprising the remainder of said belt, said first belt portion having a greater longitudinal rigidity than said second belt portion, the improvement wherein the belt material forming said first belt portion is itself substantially non-resilent and more rigid than the belt material forming said second belt portion.

2. A vehicle safety belt apparatus as specified in claim 1 wherein said first portion comprises approximately 25 percent of the total length of said belt.

3. A vehicle safety belt apparatus as specified in claim 1 wherein the rigidity of said first portion is increased by impregnating said belt with plastic.

4. A vehicle safety belt apparatus as specified in claim 3 wherein said plastic comprises a synthetic resin.

* * * * *